United States Patent [19]

Lomas

[11] 4,396,531
[45] Aug. 2, 1983

[54] FLUID CATALYST REGENERATION PROCESS AND APPARATUS

[75] Inventor: David A. Lomas, Arlington Heights, Ill.

[73] Assignee: UOP Inc., Des Plaines, Ill.

[21] Appl. No.: 292,364

[22] Filed: Aug. 13, 1981

[51] Int. Cl.³ .................. B01J 29/38; B01J 21/20; C10G 11/18
[52] U.S. Cl. .................. 252/417; 208/164; 422/144
[58] Field of Search .................. 252/417, 419, 420; 208/164

[56] References Cited

U.S. PATENT DOCUMENTS

| | | | |
|---|---|---|---|
| 2,414,852 | 1/1947 | Burnside et al. | 252/417 |
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,596,748 | 5/1952 | Watson et al. | 252/417 |
| 2,735,802 | 2/1956 | Jahnig | 208/160 |
| 2,819,951 | 1/1958 | Medlin et al. | 23/288 |
| 2,862,798 | 12/1958 | McKinney | 23/288 |
| 2,873,175 | 2/1959 | Owens | 23/288 |
| 2,970,117 | 1/1961 | Harper | 252/417 |
| 3,351,548 | 11/1967 | Payne et al. | 208/120 |
| 4,162,213 | 7/1979 | Zrinscak Jr., et al. | 252/419 |
| 3,990,992 | 11/1976 | McKinney | 252/417 |
| 4,219,442 | 8/1980 | Vickers | 252/417 |
| 4,276,149 | 6/1981 | Chester et al. | 252/420 |
| 4,284,494 | 8/1981 | Bartholic et al. | 208/113 |
| 4,325,817 | 4/1982 | Bartholic et al. | 252/417 |

OTHER PUBLICATIONS

"Fluidized Bed Heat Transfer: A Generalized Dense—Phase Correlation", A. I. Ch. E. Journal; Dec. 1956; vol. 2, No. 4; pp. 482–488.

Primary Examiner—P. E. Konopka
Attorney, Agent, or Firm—James R. Hoatson, Jr.; Louis A. Morris; William H. Page, II

[57] ABSTRACT

A catalyst regeneration process and apparatus for the oxidative removal of coke from a coke contaminated fluid catalyst for use of the catalyst in a catalytic cracking reaction zone. The process comprises a high temperature coke combustion zone, a catalyst disengagement zone and an external heat removal zone comprising a shell and tube heat exchanger. A mixture of coke contaminated catalyst, and oxygen containing gas are contacted in the high temperature combustion zone. Catalyst is cooled by passing it through the shell side of the heat exchanger with a cooling medium through the tube side. The cooled catalyst is passed to the reaction zone. The catalyst is maintained in the cooling zone as a dense phase fluidized bed by passing a fluidizing gas into the bottom of the shell side. Steam is the preferred fluidizing gas. The rate at which fluidizing gas is passed to the bottom portion of the shell of the heat exchanger is adjusted to optimize the quantity of heat transferred to the cooling medium in the tubes, the passivation of contaminating metals on the catalyst and the stripping of inerts from the catalyst.

4 Claims, 1 Drawing Figure

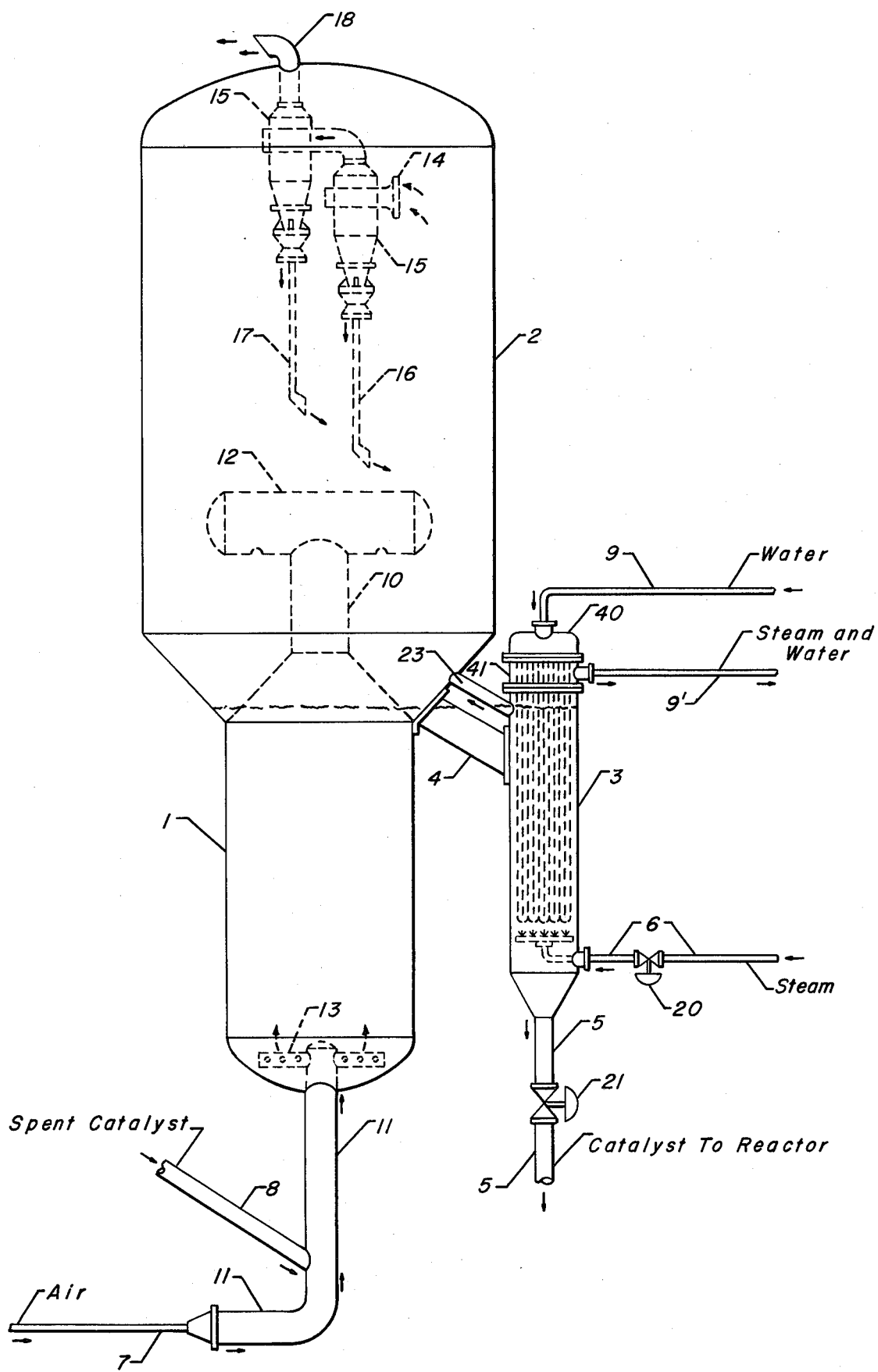

FLUID CATALYST REGENERATION PROCESS AND APPARATUS

BACKGROUND OF THE INVENTION

The field of art to which this invention pertains is fluid catalyst regeneration. It relates to the rejuvenation of particulated solid, fluidizable catalyst which has been contaminated by the deposition thereupon of coke. The present invention will be most useful in the process for regenerating coke-contaminated fluid cracking catalyst, but it should find use in any process in which coke is burned from a solid, particulated, fluidizable catalyst.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen containing gas at conditions such that the coke is oxidized and a considerable amount of heat is released. A portion of this heat escapes the regenerator with flue gas, comprised of excess regeneration gas and the gaseous product of coke oxidation, and the balance of the heat leaves the regenerator with the regenerated, or relatively coke free, catalyst. Regenerators operating at superatmospheric pressures are often fitted with energy-recovery turbines which expand the flue gas as it escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent," that is partially deactivated by the deposition of coke upon the catalyst. Catalyst from which coke has been substantially removed is spoken of as "regenerated catalyst."

The rate of conversion of the feedstock within the reaction zone is controlled by regulation of the temperature, activity of catalyst and quantity of catalyst (i.e. catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate an increase in the rate of flow of circulating fluid catalyst from the regenerator to the reactor is effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that this higher catalyst circulation rate is sustainable by virtue of the system being a closed circuit; and, the higher reactor temperature is sustainable by virtue of the fact that the increased circulation, once effected, produces an increase in the amount of coke being formed in the reaction and deposited upon the catalyst. This increased production of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

Recently, politico-economic restraints which have been put upon the traditional lines of supply of crude oil have made necessary the use, as starting materials in FCC units, of heavier-than-normal oils. FCC units must now cope with feedstocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and/or the higher the carbon to hydrogen ratio, the higher will be the coke level on the spent catalyst. Also high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burned in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe about 1400°–1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in excess of 1500° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

A common prior art method of heat removal provides coolant filled coils within the regenerator, which coils are in contact with the catalyst from which coke is being removed. For example, Medlin et al. U.S. Pat. Nos. 2,819,951, McKinney 3,990,992 and Vickers 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesired, because the typical metallurgy of the coils is such that the coils would be damaged by exposure to the higher regenerator temperatures (up to 1400° F.) without coolant serving to keep them relatively cool. The second zone is also for catalyst disengagement prior to passing the flue gas from the system, and may contain catalyst in a dense phase (Medlin et al. and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Harper U.S. Pat. Nos. 2,970,117; Owens 2,873,175; McKinney 2,862,798; Watson et al. 2,596,748; Jahnig et al. 2,515,156; Berger 2,492,948; and Watson 2,506,123. At least one of the above U.S. patents (Harper) discloses that the rate of return of the cooled catalyst to the regenerator may be controlled by the regenerator (dense catalyst phase) temperature.

It is known to those skilled in the art of chemical engineering that the heat transfer coefficient of a heat exchange surface varies in relation to the mass velocity across such surface for fluidized systems. See, for example, the article "Fluidized Bed Heat Transfer: A Generalized Dense-Phase Correlation;" *A.I.Ch.E. Journal;* December, 1956; Vol. 2, No. 4; ppg. 482-488.

The present invention, in contradistinction to the above prior art teachings, uses an external cooler to cool a regenerated catalyst stream not being recycled to the regenerator, but being passed directly from the cooler to the FCC reactor. This scheme combined with the catalyst being passed through the shell side of the shell and tube heat exchanger, which comprises the cooler, and a controllable quantity of fluidizing gas also being passed to the shell side of the heat exchanger, enables a unique opportunity to utilize principles involving the relationship between heat transfer coefficients and mass velocity to control the amount of cooling, as well as to take advantage of means to prepare the regenerated catalyst for use in the reactor involving the choice of fluidizing gas composition and the effect of that composition on the catalyst.

SUMMARY OF THE INVENTION

Accordingly, the invention is, in one embodiment, a process for regenerating a coke contaminated fluid catalyst for use in a fluidized catalytic cracking reaction zone, the process including the steps of: (a) introducing oxygen containing regeneration gas and coke contaminated fluid catalyst into a lower locus of a dilute phase combustion zone maintained at a temperature sufficient for coke oxidation and therein oxidizing coke to produce hot regenerated catalyst and hot flue gas; (b) transporting the hot flue gas and the hot regenerated catalyst from an upper locus of the combustion zone into a regenerated catalyst disengaging zone, wherein the hot regenerated catalyst is separated from the flue gas; (c) transporting the hot regenerated catalyst from the disengaging zone to the upper locus of a cooling zone separate from the disengaging zone wherein said cooling zone the hot regenerated catalyst is passed downwardly and heat is withdrawn from the hot regenerated catalyst by indirect heat exchange with a cooling fluid enclosed in a heat exchange means inserted into the cooling zone to produce relatively cool regenerated catalyst, the catalyst being maintained in the cooling zone as a dense phase fluidized bed by passing a fluidizing gas upwardly through such bed; and, (d) withdrawing the relatively cool regenerated catalyst from a lower locus of the cooling zone and transporting the catalyst to the fluidized catalytic cracking reaction zone.

In a second embodiment, the invention is an apparatus for regenerating a coke contaminated, fluid catalyst for use in a fluid catalytic cracking reactor which apparatus comprises in combination: (a) a vertically oriented combustion chamber; (b) a disengagement chamber located superadjacent to and above the combustion chamber and in communication herewith; (c) a catalyst collection section at the bottom of the disengagement chamber; (d) a shell and tube heat exchanger of vertical orientation remote from the combustion and disengagement chamber, having a catalyst inlet at an upper portion of the shell side of the heat exchanger and a catalyst outlet at a bottom portion of the shell side of the heat exchanger; (e) a hot catalyst conduit connecting the bottom catalyst collection portion of the disengagement chamber with the heat exchanger inlet, such that hot regenerated catalyst can flow from the disengagement chamber to the heat exchanter; (f) a fluid catalytic cracking reactor chamber; (g) a cooled catalyst conduit connecting the catalyst outlet of the heat exchanger with the catalytic cracking reactor chamber, such that cooled catalyst can flow from the heat exchanger to the reactor chamber; (h) a fluidizing gas inlet conduit connected to a bottom portion of the shell side of the heat exchanger, such that fluidizing gas can pass into the shell side and maintain a fluidized catalyst bed therein; (i) a control valve placed in the fluidizing gas inlet conduit so as to enable the control of the rate of introduction of the fluidizing gas to the heat exchanger; and (j) inlet and outlet conduits connected to the tubes of the heat exchanger, such that a cooling fluid can flow through the tubes.

Other embodiments of the present invention encompass further details such as process streams and the function and arrangement of various components of the apparatus, all of which are hereinafter disclosed in the following discussion of each of these facets of the invention.

BRIEF DESCRIPTION OF THE DRAWING

The FIGURE is a sectional, elevation view of the regeneration portion of an FCC apparatus according to the present invention, showing combustion zone 1, disengagement zone 2, cooling zone (heat exchanger) 3, hot catalyst conduit 4, heat exchanger and cooled catalyst discharge conduit 5 and various details showing the interconnection of heat exchanger 3 with disengagement zone 2.

The above described drawing is intended to be schematically illustrative of the present invention and not be a limitation thereon.

DETAILED DESCRIPTION OF THE INVENTION

The present invention, in its process aspects, consists of steps for the regenerative combustion within a combustion zone of the coke contaminated catalyst from a reaction zone to form hot flue gas and hot regenerated catalyst, disengagement and collection of the hot regenerated catalyst, cooling of the hot regenerated catalyst within a heat removal zone, and the use of the cooled regenerated catalyst to crack feedstock in the reaction zone. As used herein, the term "hot regenerated catalyst" means regenerated catalyst at the temperature leaving the combustion zone, from about 1300° F. to about 1400° F., while the term "cool regenerated catalyst" means regenerated catalyst at the temperature leaving the cooling zone, from about 100° F. to about 250° F., less than the temperature of the hot regenerated catalyst.

Reference will now be made to the attached drawing for a discussion of the regeneration process and apparatus of the invention. In the FIGURE regeneration gas, which may be air or another oxygen containing gas, enters in line 7 and mixes with coke contaminated catalyst entering in conduit 8. These streams are shown as all flowing together into mixing conduit 11, although each stream could flow individually into combustion zone 1. The resultant mixture of coke contaminated catalyst, regenerated catalyst and regeneration gas are distributed into the interior of combustion zone 1, at a lower locus thereof, via conduit 11 and distributor 13. Coke contaminated catalyst commonly contains from about 0.1 to about 5 wt.% carbon, as coke. Coke is predominately comprised of carbon, however, it can contain from about 5 to about 15 wt.% hydrogen, as well as sulfur and other materials. The regeneration gas and entrained catalyst flows upward from the lower part of combustion zone 1 to the upper part thereof in dilute phase. The term "dilute phase," as used herein, shall mean a catalyst/gas mixture of less than 30 lbs. per cubic foot, and "dense phase" shall mean such mixture equal to or more than 30 lbs. per cubic foot. Dilute phase conditions, that is a catalyst/gas mixture of less than 30 lbs. per cubic foot, and typically 2–10 lbs. per cubic foot, are very efficient for coke oxidation. As the catalyst/gas mixture ascends within combustion zone 1 the heat of combustion of coke is liberated and absorbed by the now relatively carbon free catalyst, in other words by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst/gas stream upon surface 12 causes almost all of the hot regenerated catalyst flowing from the combustion zone to disengage from the flue gas and fall to the bottom portion of disengagement zone 2. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enters separation means 15 through inlet 14.

These separation means may be cyclone separators, as schematically shown in the FIGURE, or any other effective means for the separation of particulated catalyst from a gas stream. Catalyst separated from the flue gas falls to the bottom of disengagement zone 2 through conduits 16 and 17. The flue gas exits disengagement zone 2 via conduit 18, through which it may proceed to associated energy recovery systems. Having the disengagement zone in upward communication with the combustion zone is advantageous, in comparison to schemes in which the gas/catalyst mixture flows upward into a relatively dense phase heat removal zone, in that, with the former, there is a substantial reduction in the loading of the regenerator cyclones which virtually eliminates large losses of catalyst from FCC units during operational upsets.

Catalyst collected in the disengaging zone is passed in dense phase, via hot catalyst conduit 4, downwardly into cooling zone 3 which comprises a shell and tube heat exchanger. Hot catalyst conduit 4 connects to the shell side of heat exchanger 3. Heat exchanger 3 will be of vertical orientation with the catalyst flowing into the shell and the heat exchange medium passing through the tubes via lines 9 and 9'. The preferred heat exchange medium would be water, which would change at least partially from liquid to vapor phase when passing through the tubes. The tube bundle in the heat exchanger will preferably be of the "bayonet" type wherein one end of the bundle is unattached, thereby minimizing problems due to the expansion and contraction of the heat exchanger components when exposed to and cooled from the very high regenerated catalyst temperatures. The heat transfer that occurs is directionally from the catalyst, through the tube walls and into the heat transfer medium. Fluidizing gas, preferably steam, is passed into a lower portion of the shell side of heat exchanger 3 via line 6, thereby maintaining a dense phase fluidized catalyst bed in the shell side. Control valve 20 is placed in line 6. Control valve 20 will be on flow control and capable of adjustment of the rate of fluidizing gas to achieve optimization of a combination of variables affected by that rate, particularly when the fluidizing gas is steam. These variables comprise: the quantity of heat to be withdrawn from the catalyst in the cooling zone; the desired extent of passivation by the steam of contaminating metals on the catalyst; and the extent desired of the stripping of non-condensible gases from the catalyst by the steam.

The fluidizing gas rate affects the quantity of heat withdrawn from the catalyst because it affects the mass velocity of the fluidized bed over the outside surfaces of the tubes by affecting the extent of turbulence of the bed. This in turn affects the heat transfer coefficient across such surfaces, and thus the quantity of heat transfer.

When the fluidizing gas is steam, some passivation of the undesired catalytic activity of contaminating metals such as nickel and vanadium is achieved. By first contacting the relatively cool catalyst at the bottom of the heat exchanger with the fluidizing gas, the thermal shock which would be caused by an extreme difference in temperature between the steam and catalyst has abeen minimized thereby aiding the stability of the catalyst system. Contacting catalyst with steam at elevated temperatures does cause some catalyst deactivation. However, FCC processing of residual feedstocks requires high catalyst addition and withdrawal rates in order to maintain catalyst metal concentrations at reasonable levels. Thus, with these high addition rates, the effect of steam deactivation would probably be insignificant and might even help reduce the undesirable (non-selective) activity characteristics of fresh catalyst prior to introducing that catalyst to the reactor.

The fluidizing gas, particularly steam, also serves to strip non-condensible gases adsorbed on the catalyst in the regeneration zone, such as oxides of carbon and nitrogen. If these gases are allowed to be carried over into the reaction zone they are then released and create an additional load on the compressing means in the FCC gas concentration facilities.

By "optimization" of the above variables it is meant the adjustment of the rate of the fluidizing gas to a point where the desired balance is struck between these variables. Thus, for example, the rate of fluidizing steam might not be raised to the level where the maximum metals passivation would occur because to do so would cause a much greater than desired amount of heat removal from the catalyst. However, the rate might still be slightly above that corresponding to the exact amount of heat removal desired, because slightly greater than that amount could be tolerated to obtain a greater extent of metals passivation.

Control valve 21 will regulate the flow of catalyst from heat exchanger 3 to the reactor vessel via conduit 5. There may be a catalyst flow control system, which is not shown, associated with valve 21, such as means to sense the temperature at a selected location in the reactor vessel, temperature control means having an adjustable set point connecting with the temperatures sensing means and developing an output signal, and means for transmitting the output signal to control valve 21 whereby the latter is adjusted responsive to the temperature, thereby regulating the flow of catalyst from the heat exchanger and maintainiing a desired reactor temperature. The reaction zone temperature, of course, varies directly and almost immediately with the rate of recycled regenerated catalyst. The catalyst even after leaving the heat exchanger will be at a temperature of not less than about 1100° F., substantially hotter than the temperature of the FCC feedstock (which is not greater than about 700° F.).

In the FIGURE, heat exchanger 3 is shown with the shell side filled with a dense phase fluidized catalyst bed to a level slightly higher than the catalyst inlet into heat exchanger 3. Catalyst spills into the inlet of conduit 4 from the catalyst collection section at the bottom of collection chamber 2 and flows through conduit 4 into heat exchanger 3. A vent 23 is shown from heat exchanger 3 to disengagement chamber 2 above hot catalyst conduit 4 which serves to allow fluidizing gas to escape from the shell of heat exchanger 3 into the disengagement zone. The tube bundle shown is of the bayonet-type in which the tubes are attached at the top or "head" of the heat exchanger, but not at any other location. A typical configuration of tubes in the bayonet-type bundle would be one inch tubes each descending from inlet manifold 40 in the head down into the shell through a three inch tube sealed at its bottom, each one inch tube emptying into the three inch tube in which it is contained just above the sealed end of the three inch tube. A liquid, such as water, would be passed down into the one inch tubes, would empty into the three inch tubes, would absorb heat from the hot catalyst through the wall of the three inch tubes as it passed upward through the annular space of the three inch tubes and would exit the heat exchanger, at least partially vaporized, from outlet manifold 41 in the head.

The above scheme provides the ability to remove heat from the catalyst to the FCC reactor as required to maintain the reaction zone temperature and at the same time provide a means for contaminating metals passivation and inert gas stripping.

ILLUSTRATIVE EMBODIMENT

The following Illustrative Embodiment represents a particularly preferred mode contemplated for the practice of the invention, expressed in terms of the mass flow rates and temperatures of streams flowing in the regenerator depicted in the attached FIGURE. The regenerator processes spent catalyst from a reaction zone which is cracking a reduced crude oil feedstock. In the tabulation below the streams flowing within conduits are tabulated in registry with the item numbers of the conduits shown in the FIGURE.

| Stream | | lbs./hr. | °F. |
|---|---|---|---|
| 8 | Coke Contaminated Catalyst (from reactor) | 2,724,552 | 1050 |
| | Catalyst | 2,691,362 | 1050 |
| | Coke | 30,902 | 1050 |
| 7 | Regeneration Gas (air) | 463,530 | 307 |
| 4 | Hot Regenerated Catalyst from Disengagement Zone (to cooler) | 2,691,362 | 1380 |
| 10 | Hot Regenerated Catalyst plus Hot Flue Gas | 4,114,730 | 1400 |
| | Hot Catalyst | 3,621,428 | 1400 |
| | Hot Gas | 493,302 | 1400 |
| 5 | Cool Regenerated Catalyst (to reactor) | 2,691,362 | 1230 |
| 18 | Flue Gas | 493,302 | 1400 |
| 3 | Heat Removed by Heat Removal Means - 169.17 × 10⁶BTU/hr. Heat Losses from Regenerator Vessel - 3.41 × 10⁶BTU/hr. | | |

What is claimed is:
1. A process for regenerating a coke contaminated fluid catalyst for use in a fluidized catalytic cracking reaction zone, said process including the steps of:
   (a) introducing oxygen containing regeneration gas and coke contaminated fluid catalyst into a lower locus of a combustion zone maintained at a temperature sufficient for coke oxidation and therein oxidizing coke to produce hot regenerated catalyst and hot flue gas;
   (b) transporting said hot flue gas and said hot regenerated catalyst from an upper locus of said combustion zone into a regenerated catalyst disengaging zone, wherein said hot regenerated catalyst is separated from said flue gas;
   (c) transporting said hot regenerated catalyst from said disengaging zone to the upper locus of a cooling zone separate and extrinsic from said disengaging zone where in said cooling zone said hot regenerated catalyst is passed downwardly in indirect heat exchange with an aqueous cooling fluid enclosed in a heat exchange means inserted into said cooling zone to produce relatively cool regenerated catalyst, said catalyst being maintained in said cooling zone as a dense phase fluidized bed by passing a fluidizing gas comprising steam upwardly through such bed, wherein the rate of flow of said stream to said cooling zone is adjusted to achieve optimization of a combination of variables comprising:

(i) the quantity of heat to be withdrawn from said catalyst in said cooling zone;

(ii) the extent of passivation of contaminating metals comprising nickel and vanadium desired by the passage of said steam, or (iii) the extent of stripping of non-condensible gases from said catalyst being cooled in said separate and extrinsic cooling zone; and (d) withdrawing said relatively cool regenerated catalyst from a lower locus of said cooling zone and transporting said catalyst to said fluidized catalytic cracking reaction zone and passing said fluidizing gas comprising steam from said cooling zone into the catalyst in said disengaging zone.

2. The process of claim 1 wherein the temperature at a selected locus of said reaction zone is controllably maintained by controlling the quantity of said relatively cool regenerated catalyst to said reaction zone in response to said temperature at said selected locus.

3. The process of claim 1 wherein said cooling fluid comprises water.

4. The process of claim 3 wherein said water cooling fluid changes from liquid to vapor phase while absorbing heat in said heat exchange means.

* * * * *